Patented Oct. 18, 1927.

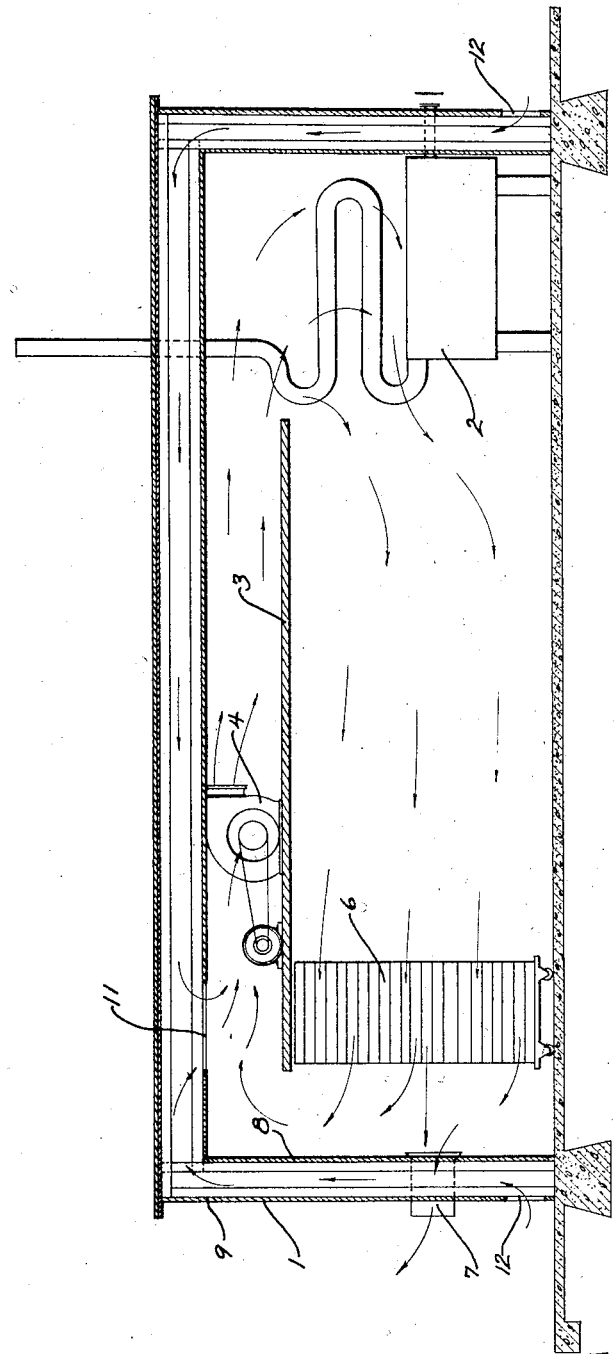

1,645,760

UNITED STATES PATENT OFFICE.

FREDERICK F. KNIPSCHILD, OF OAKLAND, CALIFORNIA.

DRIER OR DEHYDRATING PLANT.

Application filed May 10, 1926. Serial No. 108,064.

The present invention relates to improvements in driers or de-hydrating plants and has particular reference to plants of this character used in connection with the drying of fruit, although the principle of the invention may be applied in various other plants of similar descriptive properties.

The particular object of the invention is to provide improvements in the circulating system of driers of this character. It is customary to make the enclosures of such driers of heat insulating material such as wood, brick, tiles or the like, the idea being to confine the heat within the drier as much as possible. I have found, however, that expedients of this character are not only expensive, particularly where hollow tiles are used in the structure, but that they are also little efficient, it being observed that the walls radiate considerable heat into the atmosphere requiring a corresponding surplus of heat to be generated within the drier for maintaining a desired temperature.

The object of the present invention is to provide a structure that is not only cheaper to erect but that is also more economic in saving heat units.

It is intended in the present invention to provide a double wall for a drier of this character and to cause the draft of a circulating system within the drier to draw on the spaces between the wall elements, the theory being that the inner wall is heated by the heat within the drier which heat is radiated into the hollow space between the walls and communicated to the air therein so that the latter when entering the drier is already pre-heated, while fresh air following the withdrawn air absorbs additional heat units from the inner wall. The constant draft of fresh air through the space between the walls keeps the outer wall substantially cool, so that practically no heat is radiated into the atmosphere.

The preferred form of my invention is illustrated in the accompanying drawing which shows diagrammatically in vertical section a drier of the character described, having my improved feature combined therewith.

While I have shown only the preferred form of the invention, it should be understood that various changes or modifications may be made within the scope of the claims hereto attached, without departing from the spirit of the invention.

In its simplest form, a drier or de-hydrating plant comprises an enclosure 1, a heating plant 2, a partition 3 and a blower 4, causing the air to circulate in the enclosure, and driving the same through one or more stacks 6 of trays having fruit to be dried disposed thereon. A vent 7 is usually provided which allows a portion of the humid air to escape therethrough.

My invention is principally concerned with the air intake which at the present time usually consists in one or more apertures in the wall structure. My invention consists in making the enclosure of a double wall, the inner wall being shown at 8, and the outer wall at 9. In the inner wall I provide an opening as at 11 communicating with the space inside of the drier and in the outer wall I provide openings 12 communicating with the atmosphere, the latter openings being preferably near the ground, while the former opening may be in the roof of the building.

The circulation in this structure is as follows:—

Air is sucked from the atmosphere through the openings 12, is guided through the space between the two walls where it absorbs heat units from the inner wall and finally enters through the opening 11 in the inner wall into the heating compartment. It is then circulated in accordance with the circulating system designed for the drier, following in the instance selected, the partition 3, turning around the same past the heater into the space occupied by the trays, traverses the latter space and when reaching the end of the enclosure divides itself, a portion being discharged as humidified air through the opening 7, while another portion flows around the opposite end of the partition and joins fresh air entering through the opening 11 to partake further of the circulation.

Where the structure of my invention is selected, the two walls may be made of heat conducting material such as sheet metal, since the heat escaping through the inner wall is caught by the air guided through the space between the walls and is re-introduced into the drier through the opening 11. Since a continuous fresh supply of air passes through the space between the walls, heat units escaping through the inner wall are continuously and immediately absorbed so that the outer wall remains substantially cool, and no heat escapes into the atmosphere.

I claim:

1. A drier of the character described comprising an enclosure, a heat circulating system within the enclosure, an outlet for the same and guide means causing the circulating system to draw on air immediately surrounding the enclosure for a fresh supply of air.

2. A drier of the character described, comprising an enclosure having spaced metallic enclosing elements, a heat circulating system within the enclosure and an outlet for the same, the space within the enclosure communicating with the space between the enclosing elements for drawing on the air confined therebetween.

3. In a drier of the character described, a double wall enclosure, apertures in the outer wall near the bottom thereof, apertures in the roof of the inner wall, a heat circulating system within the enclosure and an outlet in the wall intermediate the height thereof, causing atmospheric air to be drawn through the apertures in the outer wall, the space between the double walls and the aperture in the inner wall into the enclosure to join the circulating air therein, a portion of the circulating air escaping through the outlet.

In testimony whereof I affix my signature.

FREDERICK F. KNIPSCHILD.